United States Patent [19]

Shyu

[11] Patent Number: 5,428,544
[45] Date of Patent: Jun. 27, 1995

[54] TRAFFIC INFORMATION INTER-VEHICLE TRANSFERENCE AND NAVIGATION SYSTEM

[75] Inventor: Jia-Ming Shyu, Hsinchu Hsien, Taiwan

[73] Assignee: Norm Pacific Automation Corporation, Hsin-Fong Shiang, Taiwan

[21] Appl. No.: 89,654

[22] Filed: Jul. 8, 1993

Related U.S. Application Data

[63] Continuation of Ser. No. 608,812, Nov. 5, 1990, abandoned.

[51] Int. Cl.⁶ .......................................... G06F 165/00
[52] U.S. Cl. ................... 364/436; 364/443; 364/449; 340/902; 340/990; 340/995
[58] Field of Search ............. 364/436, 443, 444, 449; 73/178 R; 340/988, 990, 995, 905, 902; 180/167, 168, 169

[56] References Cited

U.S. PATENT DOCUMENTS

| 4,706,086 | 11/1987 | Panizza | 180/167 |
| 4,926,336 | 5/1990 | Yamada | 364/444 |
| 5,031,104 | 7/1991 | Ikeda et al. | 364/449 |
| 5,126,941 | 6/1992 | Gurmu et al. | 364/436 |
| 5,272,638 | 12/1993 | Martin et al. | 364/444 |
| 5,293,163 | 3/1994 | Kakihara et al. | 364/444 |
| 5,313,200 | 5/1994 | Sone | 364/436 |

Primary Examiner—Gary Chin
Attorney, Agent, or Firm—W. Wayne Liauh

[57] ABSTRACT

A method and an apparatus for the transference of traffic information among vehicles and for assisting navigating the vehicles. The traffic information of the vehicles, such as the speed and the route and direction, is remotely transmitted to each other during passing, via communication devices mounted on each of the vehicles. The apparatus comprises sensors to detect the direction and the displacement of the vehicle; a microcomputer to recognize the position of the vehicle by referring the detected direction and displacement to a digitized map; a receiver to receive the passing vehicle's traffic information to be processed by the microcomputer; a transmitter to transmit the traffic information to the passing vehicle; and a navigation unit in the microcomputer to generate navigation information and indicate the traffic information of vehicles ahead is transmitted to a receiving vehicle in an indirect manner via a passing vehicle.

1 Claim, 5 Drawing Sheets

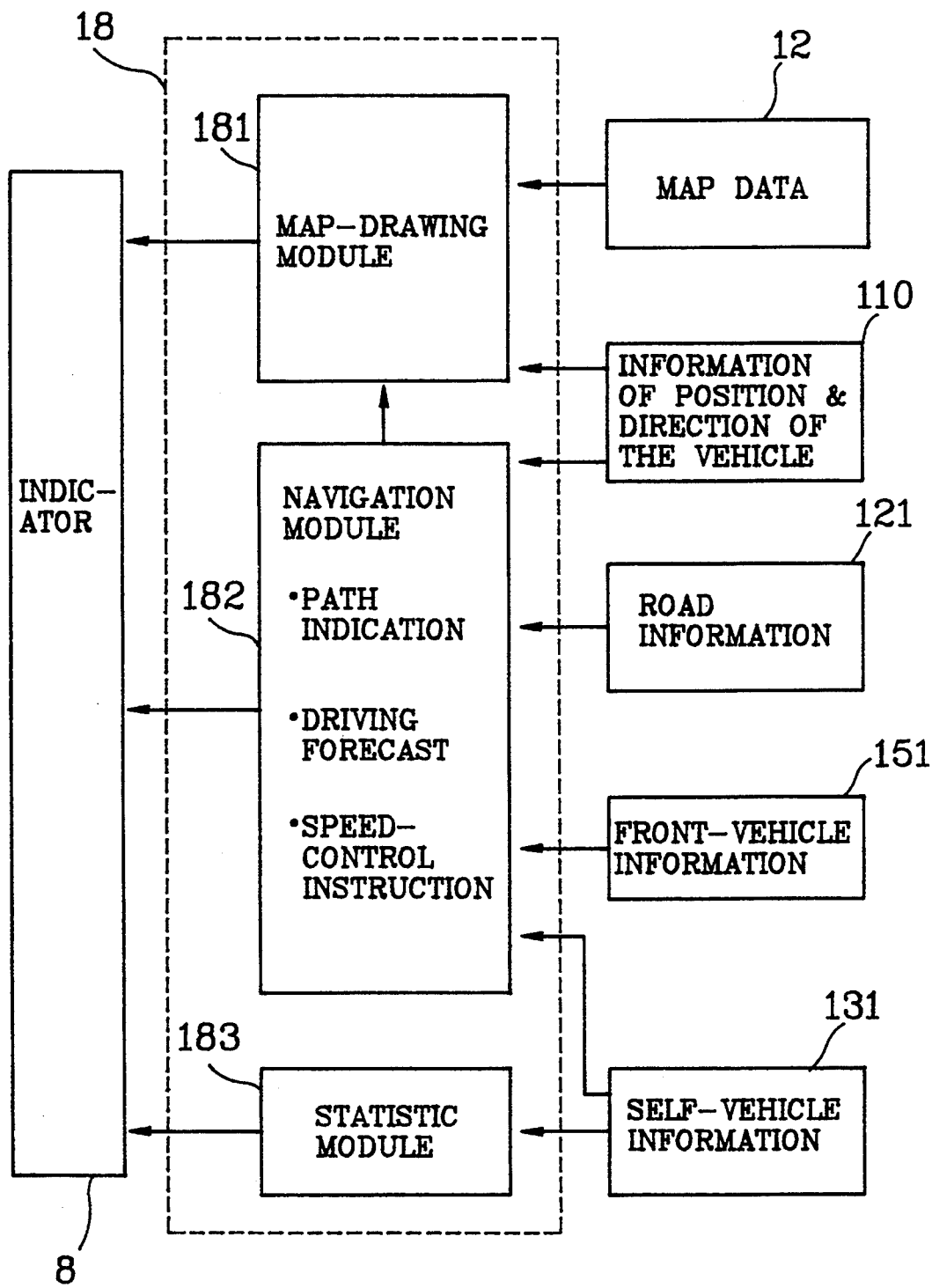
F I G . 5

TRAFFIC INFORMATION INTER-VEHICLE TRANSFERENCE AND NAVIGATION SYSTEM

This is a continuation of application Ser. No. 07/608,812, filed Nov. 5, 1990, now abandoned.

BACKGROUND OF THE INVENTION

This invention relates to a method and an apparatus for a vehicle to get traffic information and using the information to navigate. The characteristic of this invention is that a vehicle acquires the information of traffic status in front of it by means of information transference from the passing vehicles.

Some of the prior vehicle navigation systems, presently available or under development, use satellites which allow the vehicles to identify their present location, while they do not provide traffic information. Other navigation systems, using a central computer to provide traffic information for vehicles, communicate with the vehicles through signal posts allocated along the roads. Because these systems have to build transceiver posts at many adequate locations (such as each intersection), the vehicles that are not at the fight location (such as while blocked between the intersections) can not receive the information, such systems work well only in an urban area with light traffic conditions.

The U.S. Pat. Nos. 4,513,377 of Hasebe et al.; 4,963,865 of Ichikawa et al. and 5,016,007 of Iihoshi et al. disclose display systems which can display the present position of the vehicle relative to a map on a display screen through map-matching calculations. But these systems provide only static information about the path instead of dynamic conditions of the traffic.

In the U.S. Pat. No. 4,706,086, a system for communication and signalling between a plurality of vehicles is disclosed. Each vehicle is equipped with signal receiver means, transmitter means, detectors means and a control unit. It allows the driver of the vehicle to be provided with information about the travelling conditions (tailbacks, forced stops, "road clear", fog bands, rain etc.) on the stretch of road on which he is about to travel. However, the information is only about the condition of the road straight ahead. It is not concerned with traffic problems that might be encountered when travelling over a network of interconnected roads to a particular destination.

SUMMARY OF THE INVENTION

This invention, in order to solve the problems mentioned above, provides a method and an apparatus for transference of traffic information among vehicles to facilitate navigation of those vehicles. The system of this invention does not require any central computer, satellites or roadside posts.

This invention equips a vehicle with an apparatus to record traffic information such as the driving speed and the path, to send the information to other passing vehicles through a transceiver, and to receive the information from those passing vehicles. It enables the vehicles equipped with this apparatus to collect and interchange traffic information during passing, and to achieve navigation by incorporating map data and traffic information.

The composition and function of this invention will be expressed in company with the following figures.

BRIEF DESCRIPTION OF THE DRAWINGS

FIG. 5 shows a functional diagram of a navigation unit in an embodiment of this invention.

DETAILED DESCRIPTION OF PREFERRED EMBODIMENTS

Figure 1:
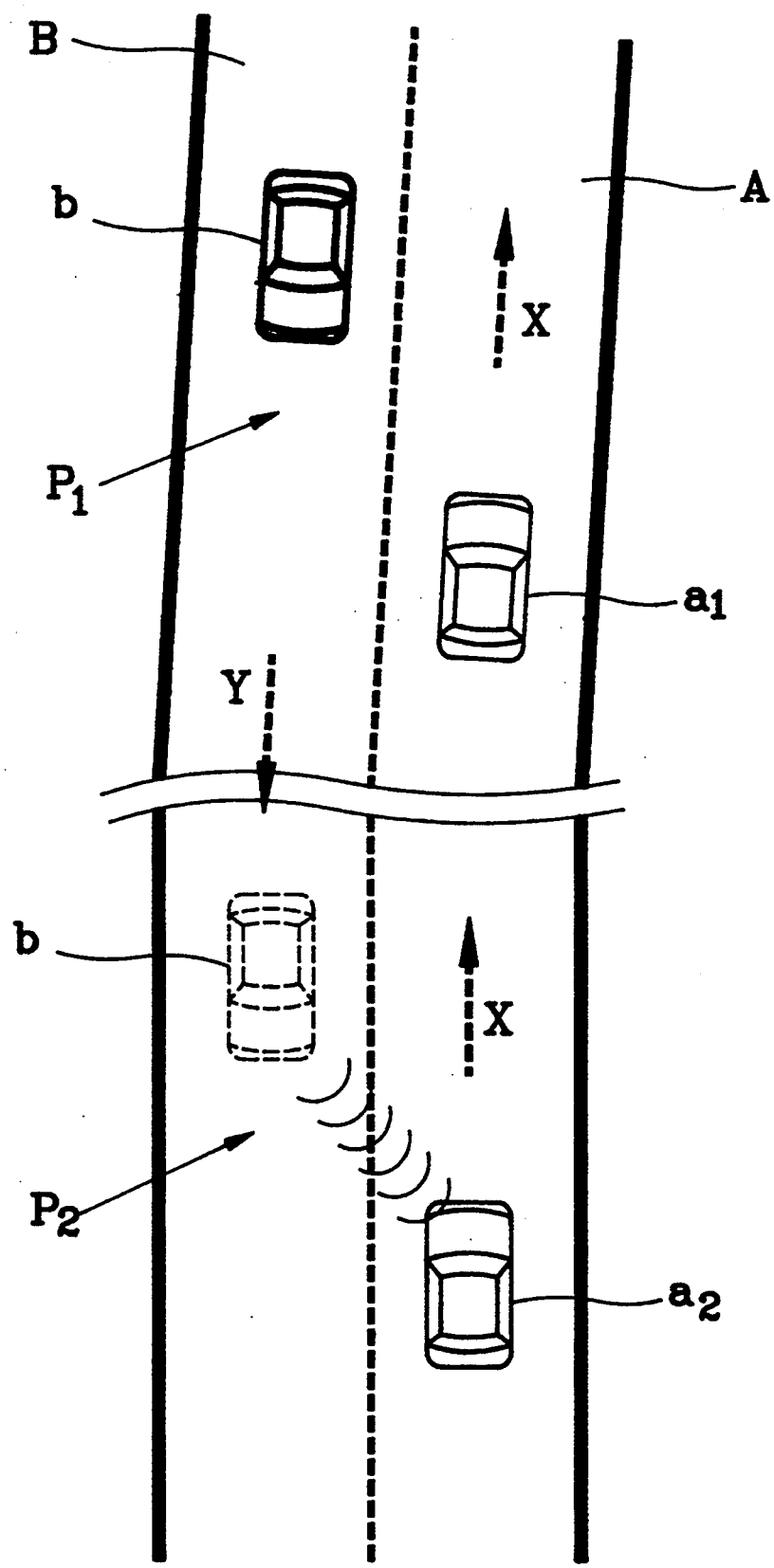
FIG. 1 shows an example of the invented method in which the traffic information of a first vehicle is transferred via a second vehicle to a third vehicle.

As FIG. 1 shows, three vehicles $a_1$, $a_2$, and b equipped with the invented apparatus, said vehicles being driven individually along two opposite paths X and Y in two adjacent roads A and B. The vehicle $a_1$ in the front on road A sends its traffic information, such as the driving path and speed, to the passing-by vehicle b at a position $P_1$. When the vehicle b passes on the vehicle $a_2$ in the rear of the road A at a position $P_2$ later, the traffic information of the vehicle a1 will then be sent to the vehicle $a_2$ by the vehicle b. As a result, the vehicle $a_2$ obtains the traffic status (e.g. the average driving speed of a certain path) in front according to the information it gets. Vehicle $a_2$ becomes a navigatable vehicle because it utilizes the traffic information for navigation purposes.

The procedure mentioned above shows how a vehicle can send information to another following vehicle behind at a distance through the medium of a vehicle on the adjacent path. In the same way, the vehicle b sends its traffic information to any vehicle behind it (not shown in the figure) through the medium of the vehicles $a_1$, $a_2$ on the adjacent road A. In other words, a vehicle with the invented apparatus collects not only the traffic information of its own but also that of other vehicles.

In practice, the distance of information transference among the passing-by vehicles (usually the vehicles are in a two-way road, cross roads, or forks of a road) is within a limited range, such as 200 meters, when the vehicles are driving close. And, a vehicle which is closely behind a vehicle up front need not receive the information about the lead vehicle because the traffic status is visible. Therefore, a low power electromagnetic wave, infrared ray or laser transceiver that points to a certain direction (for the communication of two passing vehicles only) or functions in a specific range (such as only receives signals from other vehicles within the range of 135 degrees to the fight and left sides of the driving direction) can be used.

Figure 2:
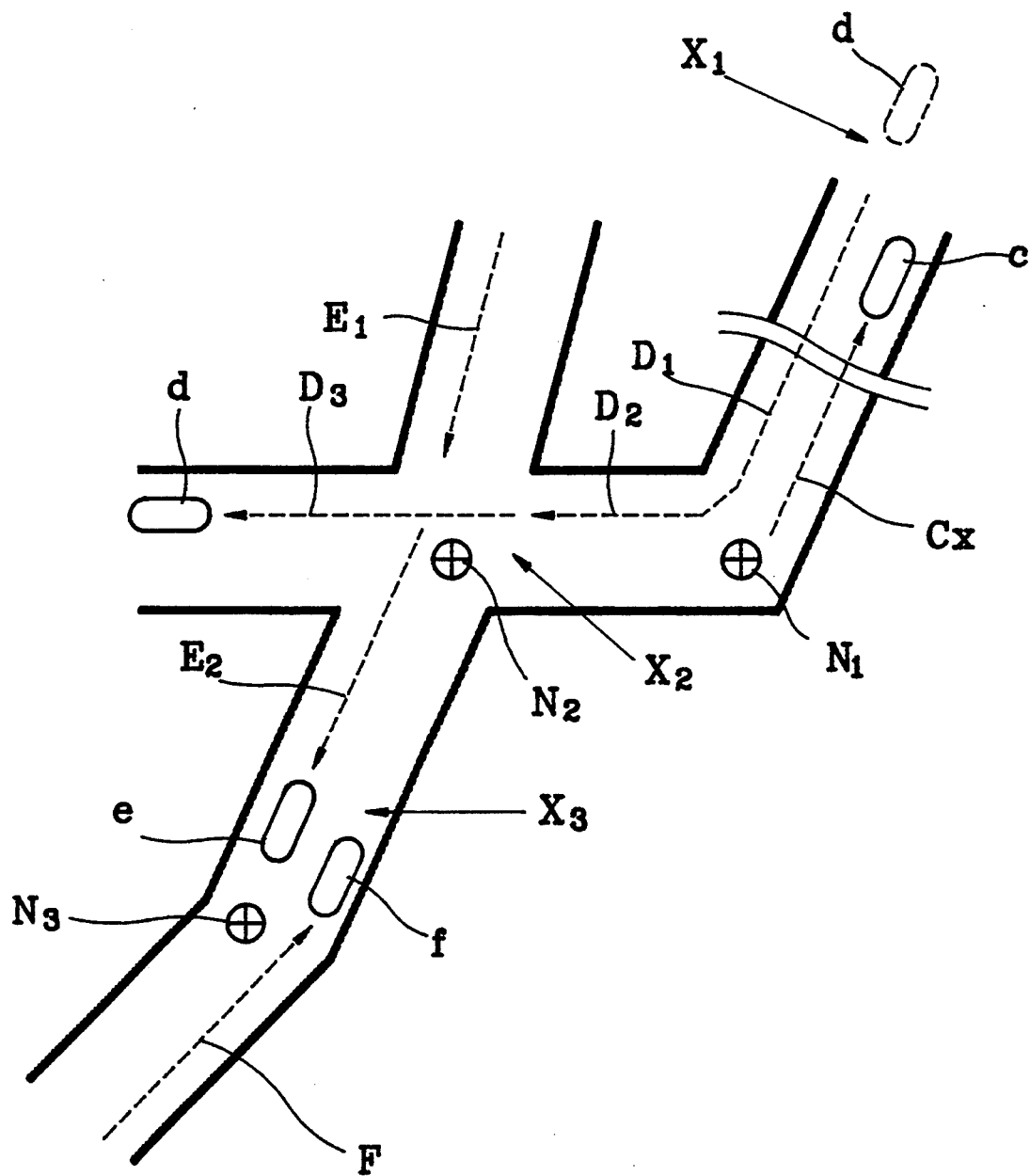
FIG. 2 shows another example of the invented method in which the traffic information of one vehicle is transferred to another vehicle via two other vehicles.

FIG. 2 shows an example of the vehicles transferring their traffic information successively. A navigatable vehicle f acquires the traffic information of a vehicle c through the help of relay vehicles d and e. The vehicle c driving along a path $C_x$ sends its traffic information to the passing-by vehicle d in a position $X_1$. Later, the vehicle d driving along paths $D_1$, $D_2$ and $D_3$ sends its traffic information to a passing vehicle e driving along paths $E_1$ and $E_2$. Then the traffic information of the vehicle c carried by the vehicle e will be relayed to the passing-by vehicle f in a position $X_3$. That is, the navigatable vehicle f along a path F will acquire the traffic status information of the front path $C_x$.

The content and the process of transference of traffic information are described as follows.

The vehicle is equipped with an electronic map device which can display digitized road map information and identification of the position of the vehicle on the map. (The vehicle may have a direction sensor and a displacement sensor to record the movement of the vehicle. The movement data combined with the starting position once set by the driver can be applied to map the locus of the vehicle to the map utilizing a prior technology.) Based on the technology, the roads on the map are constructed by straight or curved lines linking various points. (A two way or a one way road can be represented by its center line. Taking FIG. 2 as an example, the cross point $N_2$, the turning points $N_1$ and $N_3$ of the center lines are representative points of the roads.) All these points can be identified through their absolute coordinates (geological coordinates). Thus, the vehicle can be matched to the map by comparing its movement to the coordinates. For example, when the vehicle d in the path $D_1$ turns into the path $D_2$, the turning position will be mapped to the point $N_1$. (The sensed displacement of the vehicle will be revised if it differs from the map.) Also, the driving path $D_2$ of the vehicle d can be identified by the link of the points $N_1$ and $N_2$. For example, a vehicle drives through points $N_1$, $N_2$ and $N_3$, its traffic information can be described as follows:

<..., coordinates of $N_1$, average driving speed, the longest halting time, coordinates of $N_2$, average driving speed, the longest halting time, coordinates of $N_3$, ... >

Wherein, the average driving speed is the value of the mileage between two points divided by the driving time and it enables the apparatus to conjecture the traffic status whether in heavy traffic or not. The longest halting time is the longest time for a vehicle in the path while staying in an idle speed because of some reasons (such as encountering the red lights) which enables the apparatus to estimate the changing cycle of the traffic lights in the city. The process and usage will be described later. To receive and transmit the traffic information, the vehicle can be equipped with a signal transceiver using known technologies of infrared rays, laser or radio, or it can be adapted to a mobile phone with multiplexer. These are prior arts which need not to be described in detail.

The traffic information transferred among the vehicles includes the traffic information of the vehicle itself as well as of other vehicles. An example of the format of the transference is set as follows:

<starting code, code of the vehicle itself, traffic information about the vehicle itself; code of another vehicle 1, traffic information of the vehicle 1 itself; code of the other vehicle 2, traffic information of the vehicle 2 itself; ... ; code of another vehicle n, self-traffic information of the vehicle n, ending code.>

The starting code and the ending code are set for the vehicle that receives the information (which will be mentioned as receiving vehicle hereafter) to identify the signal range. For the purpose of classifying and identifying the information, the codes of the vehicles can he the license numbers or other identification numbers. The vehicles 1 to n are those in front of the receiving vehicle. The traffic information about vehicles 1 to n was previously gotten from adjacent passing vehicles, temporarily stored and later transferred to the receiving vehicle. Any outdated information, such as the routes that the receiving vehicle has already passed, will be removed.

Figure 3:
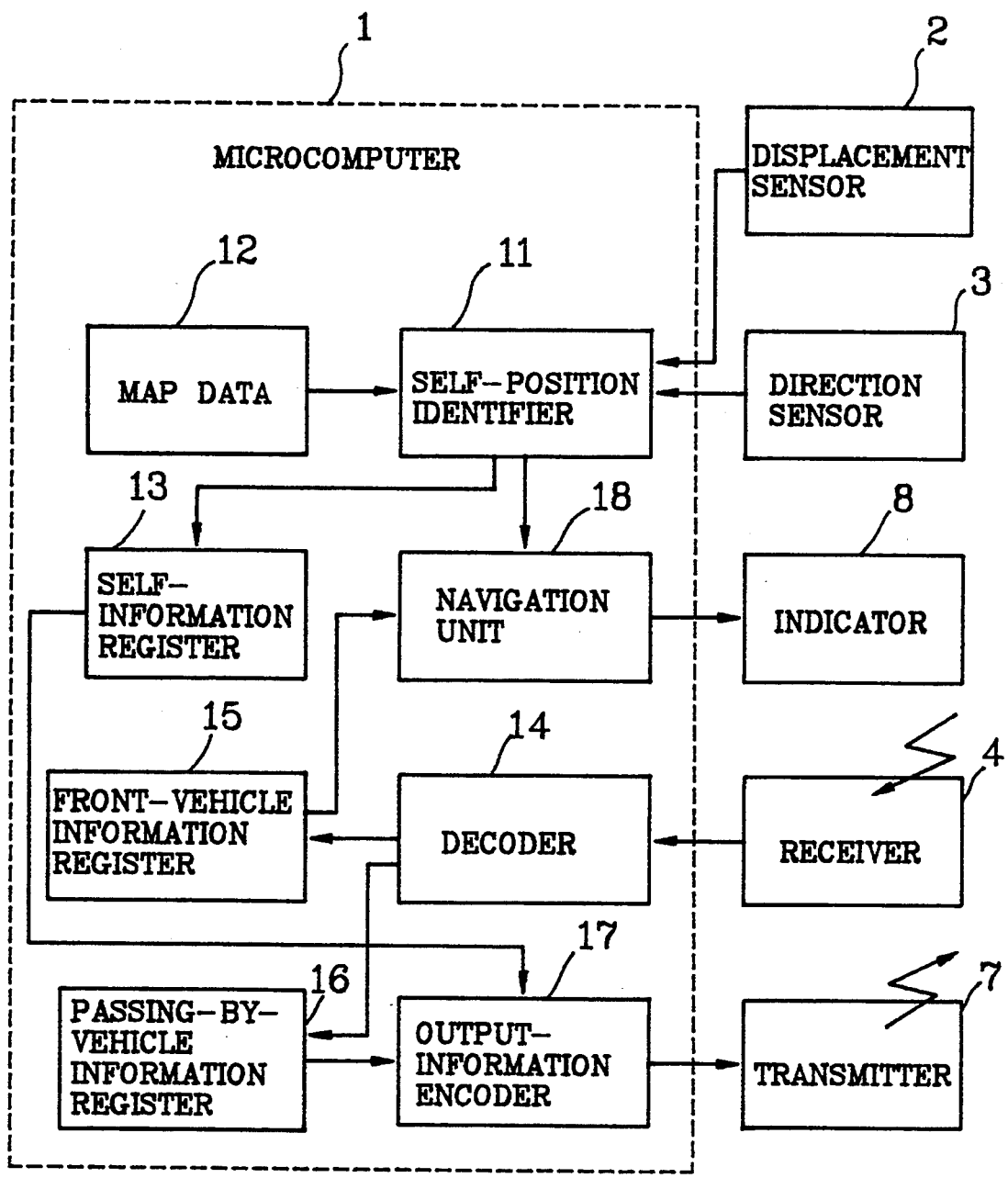
FIG. 3 shows a block diagram of an embodiment of the invented apparatus.

FIG. 3 shows the composition of an embodiment of the present invention. The main part is a microcomputer 1, including a self-position identifier 11 which receives the detected value of the above mentioned displacement sensor 2, direction sensor 3 and the map data 12 to identify the position of the vehicle. The position of the vehicle itself can be estimated by comparing the detected value with the map data 12. The differential, if any, will be revised when the vehicle changes its direction. The revision will be the reference for the following comparison. If the differential is beyond a certain range, which means there is a route not provided by the map data 12, then it can be ascertained by the driver and stored into the map. The driver, in a vehicle on a straight road for over a certain mileage, will be reminded by the apparatus to ascertain the position of the car by punching a button to clear any differential when he arrives at an evident position (such as a cross road). The traffic information of the vehicle itself is stored in a self-information register 13. The information in the register 13 can be processed by an output-information encoder 17 and sent out by a transmitter 7 as the first information of each transference as mentioned above. On the other hand, the traffic information from other vehicles is received by a receiver 4 and decoded by a decoder 14. Each first traffic information (of the vehicle itself that sends it out) will be stored in a passing-by-vehicle information register 16 and is provided to the encoder 17 and the transmitter 7 to send out. The storage in the register 16 is updated in a process of first-in & first-out and removing any information of the path already behind the receiving vehicle. The rest of the received traffic information (other than the self information of the vehicle that sends it out), i.e., information of the vehicles in front of the receiving vehicle, will be received and stored in a front-vehicle information register 15. To avoid accumulating repeated information, the information is stored based on the codes of the vehicles and is continuously updated. A navigation unit 18 fetches the data from the self-position identifier 11 and from the register 15, generates navigation information and sends it to an indicator 8. The composition and the operation of the navigation unit 18 and the indicator 8 will be described below.

Figure 4:
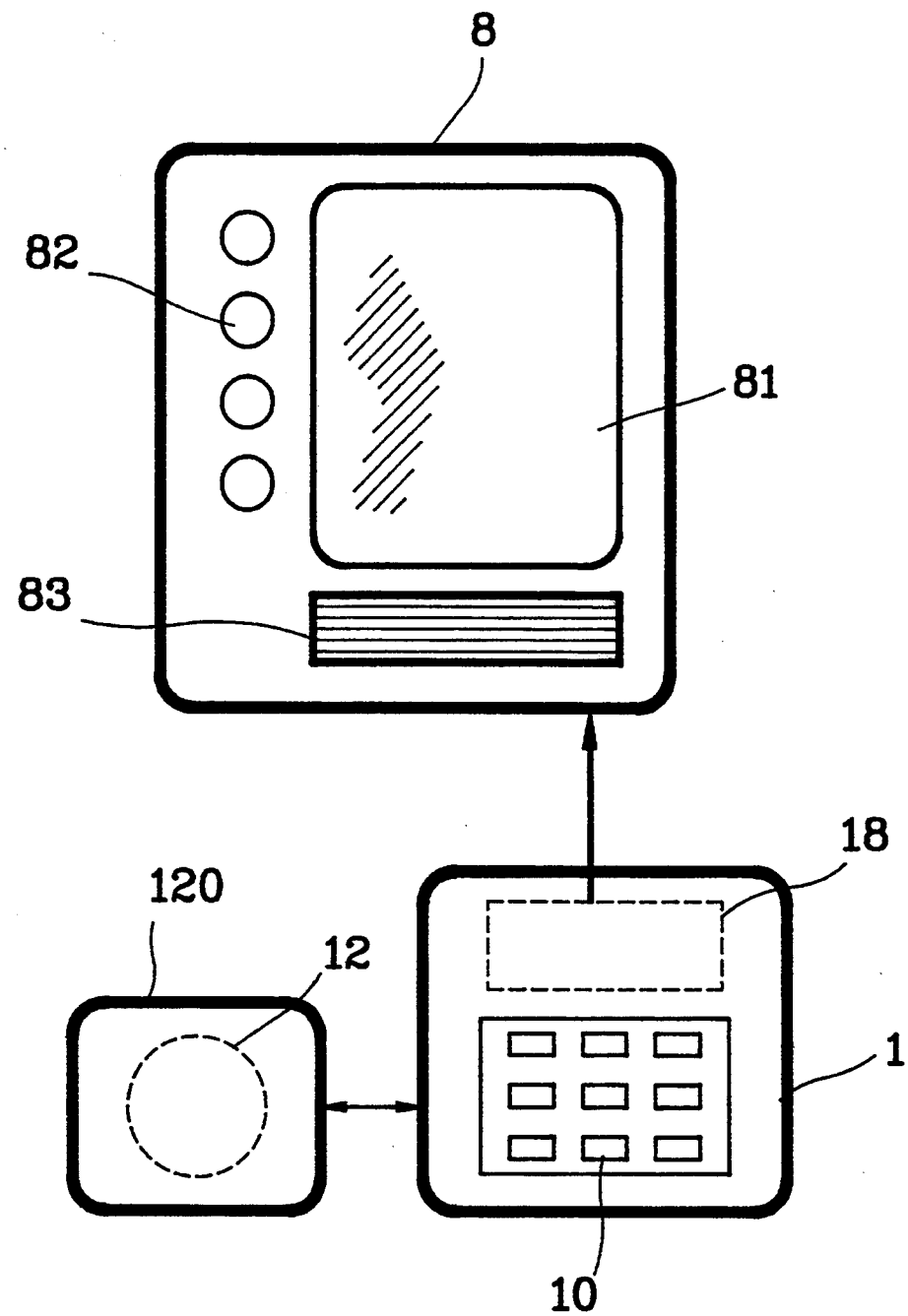
FIG. 4 shows the outward appearance of an indicator and a microcomputer of an embodiment of this invention.

FIG. 4 shows the outward appearance of an indicator and a microcomputer in an embodiment of this invention. The indicator 8 includes a liquid crystal display or a screen 81 to indicate the map and other navigation information. It can also be equipped with pilot lights 82 and a beeper or speaker 83 to provide warning sounds. The map data 12 can be stored in a compact disc (CD) and retrieved by a player 120 as shown, or a memory device (such as DRAM or SRAM) accessed by the microcomputer 1. It includes not only the road position information, road width, shape of intersections, but also the region names, road names, starting and ending numbers of the residence, driving limits (one-way street, speed limitation, etc.), and locations (including addresses and telephone numbers) of gas stations along the roadsides, restaurants and hotels, service stations, rest stations, offices, stores, and so on. The microcomputer 1 provides suitable user interfaces, such as a keyboard 10 as shown or screen-touch or verbal input units, to input commands or data—such as to contract or enlarge the map, to identify the position of the vehicle, to input the destination, etc. The composition of the navigation unit 18 set in the microcomputer 1 will be described by referring to FIG. 5.

FIG. 5 shows the content and function of the navigation unit 18 which mainly comprises a map-drawing module 181 and a navigation module 182. The map-drawing module 181 generates the map and displays it with the indicator 8 (on the screen 81 shown in FIG. 4) based on information 110 of the position and direction of the vehicle (identified by the self-position identifier 11 shown in FIG. 3) and the related map data 12. The map is displayed in two modes—the geological direction (north-up) and the vehicle direction (heading-up). For instance, when the position of the vehicle itself and the destination are not identified yet, the map is north-up and controlled by the user through interfaces (such as the keyboard 10 in FIG. 4) to move upward, downward, left and fight. When the vehicle is moving, the map is heading-up, i.e. the vehicle itself is stationary in the middle but a little bit low on the display, and the map is moving and rotating accordingly. The size (displayed area) of the map is adjustable, for example, from 0.5*0.5 km, 3*3 km, 15*15 km, 100*100 km to 600*600 km, by the user's command or automatically by the apparatus based on the relationship between the position of the vehicle and the destination—when the destination is just identified, a map in a suitable scale that covers the vehicle location and the destination will be shown. When the vehicle is driving, the size of the map can be contracted to a smaller area (such as 3*3 km); and when closing to the destination, it can be contracted to the smallest area to reveal the detail. The scope for revealing the detail is related to the size and contains only the needed information for guiding the vehicle to the destination, therefore, unnecessary details are omitted in a larger size of map.

The navigation module 182 provides functions of path indication, driving forecast and speed-control instruction. This module, after identifying the present position of the vehicle and its destination, searches for all the available paths based on road information 121 (the speed limit, allowed directions, etc., which are pans of the map data 12) and front-vehicle information 151 (such as the average driving speed stored in the front-vehicle information register 15 as shown in FIG. 3). The module calculates the driving times for all the available routes respectively, and constructs several better time-saving routes displayed on the map for reference. The routes appear either orderly by the users command, or simultaneously in bold-medium-thin line or real-dotted line formats. The module 182 also provides a gas-efficient selection by calculating the respective gas consumption for each path by multiplying its distance into the vehicle's gas consumption rate corresponding to the average driving speed. The result, depending on the user's selection through key punching, can be constructed into several displays based on gas consumption or time spent. The whole system, switched on, will continuously receive traffic information sent by the passing vehicles and update the information 151; therefore, it may refresh aforesaid better route displays at intervals, such as every 10 seconds. The already-passed route can be indicated by a flashing line. Also, the name of the passing roads and the cross roads in front should be timely updated with clear indication on the map. At a suitable time margin (depending on the driving speed) before the vehicle turns in another direction, the module 182 will alert the indicator 8 (with sound or light signal as warnings) to remind the driver to keep to the fight or left lane, and display the distance before making the turn. The indicator 8 can also display the mileage still left, the estimated arrival-time, the still-needed amount of fuel, etc., depending on the driver's command. If the fuel is not sufficient, the indicator 8 will remind the driver and display the nearest gas station and navigate. When the destination is near (for example, within 5 km), the display will start counting down the time left and mileage. The system can also suggest the cruising speed based on the traffic condition and the speed limit of each route and the desired arrival time input by the driver. On the route with frequent stops due to traffic lights, the module 182 will estimate the light changing cycle by checking the most frequent longest halting time among those of the front vehicles in the information 151, and further estimate the light changing time based on the position of the vehicle and its driving status, and then informs the driver to adjust the speed to minimize stopping, and reminds (by displaying the elapsed time) the driver to start up in time upon the light changing.

A statistic module 183, according to the user's command when he arrives in the destination, will compute and display, based on the self-vehicle information 131, the total driving time, mileage, average of driving speed, number of stops, time for stops, number of turns, and number of on-coming vehicles that it has met.

The above embodiment explains the traffic information passing among the vehicles and the possible ways to use it. In practice, the traffic information can also be received through a receiving station, similar to the central computer system and transceiver posts mentioned before, then it is processed to generate required information, including the positions of every vehicle, traffic regulations, record of collecting tolls, query for those who need it, and so on. The traffic information can also offer navigation data to those vehicles only equipped with receivers. These applications are also included in the

What is claimed is:

1. A system of communication between a first navigatable vehicle moving in a first direction and at least a second vehicle moving in a second direction; said system of communication comprising a communication device mounted on said first navigable vehicle and said second navigable vehicle, wherein said communication device comprising:

a speed sensor (2) and a direction sensor (3) for detecting a speed and direction, respectively, of said first navigatable vehicle;

a receiver (4) for receiving direction and speed signals transmitted from said second navigatable vehicle;

said receiver having a receiver output for transmitting an output containing receiver-generated signals related to the speed and direction of said second vehicle and those of other vehicles that are received by and transmitted from said second vehicle;

a decoder means (14) connected to said receiver output for decoding the receiver-generated speed and direction signals related to said second and other navigatable vehicles, said decoder means having first and second decoder outputs;

a first storage means (15) connected to said first decoder output of said decoder means for storing speed and direction information of a third navigatable vehicle travelling in said first direction but in front of said first navigatable vehicle;

a map storage device (12) containing electronic pictorial information on navigatable routes between said first navigatable vehicle and its destination;

a self-position identifier means (11) having separate inputs connected to said speed sensor, said direction sensor and said map storage device, respectively, so as to identify a position of said first navigatable vehicle relative to a selected map, said self-position identifier means having first and second identifier outputs;

a navigation unit (18) comprising a map-drawing module (181) for generating a map information through a display screen (8), and a navigation module (182) for providing a path indication and a driving instruction;

said navigation module having a first navigation input connected to the first identifier output of said self-position identifier means, and a second navigation input connected to said first storage means, said navigation module also having first and second navigation outputs;

said map-drawing module having a first drawing input connected to said map storage device and a second drawing input connected to said first navigation output of the navigation module;

a display screen being connected to said map-drawing module and to the second navigation output of the navigation module, whereby the position and direction of said first navigatable vehicle are displayed on a map on said display screen, and said second navigation output of said navigation module including a line indicated on the displayed map showing an optimum route for said first navigatable vehicle;

a second storage means (13) connected to the second identifier output of said self-position identifier means for storing the speed and direction information of said first navigatable vehicle;

a third storage means (16) connected to the second decoder output of said decoder means for storing the speed and direction information of said second navigatable vehicle;

a transmitter (7) for broadcasting vehicle speed and direction information to said second and other vehicles encountered by said first navigatable vehicle; and means (17) connected to said second and third storage means for supplying signals to said transmitter.

* * * * *